United States Patent [19]

Scelzo

[11] Patent Number: 5,679,002

[45] Date of Patent: Oct. 21, 1997

[54] FRACTIONAL-ARITHMETIC-TEACHING GAME AND METHOD FOR PLAYING

[76] Inventor: John C. Scelzo, 1774 Harte St., Baldwin, N.Y. 11510

[21] Appl. No.: 395,600

[22] Filed: Feb. 28, 1995

[51] Int. Cl.[6] .................................................. G09B 1/06
[52] U.S. Cl. .......................... 434/196; 434/195; 434/191; 434/209; 273/241; 273/243; 273/249
[58] Field of Search ...................................... 434/188, 191, 434/195, 196, 209, 128, 129; 273/241, 236, 242, 243, 248, 249, 272

[56] References Cited

U.S. PATENT DOCUMENTS

| | | |
|---|---|---|
| 2,930,146 | 3/1960 | Cassel . |
| 3,104,106 | 9/1963 | Kenney et al. .................. 434/191 X |
| 3,204,344 | 9/1965 | McMeen . |
| 3,579,860 | 5/1971 | Strem . |
| 4,778,390 | 10/1988 | Marans . |
| 4,946,168 | 8/1990 | Fauls . |
| 5,033,754 | 7/1991 | Finch . |
| 5,102,339 | 4/1992 | Parriera . |

*Primary Examiner*—Jeffrey A. Smith
*Attorney, Agent, or Firm*—Richard C. Litman

[57] ABSTRACT

An apparatus and a method for playing a math-teaching board game which enables a player student while manipulating game-pieces to gain an understanding of the concept of fractions and arithmetical operations associated therewith. The game is played by 2 to 4 players. The game includes a pyramidical-shaped board having a continuous path of steps, individual game tokens, a die, a plurality of decks of question cards for respective arithmetic operators, fraction boards and a slide box for placement of the fraction boards thereon. In playing the game, the player skillfully moves a selective game token up a number of steps based on the roll of the die. Each step on the board displays an arithmetical operator which determines which deck of question cards is selected. The player uses the fraction boards and the slide board in an attempt to visually determine the answer to a selected question. If the player answers the question correctly, the player remains on the step advanced by the die roll. If the player does not provide the correct answer, the game token must be returned to its origin. Winning the game is accomplished by the leading player, in skillfully moving the selective game token to the top step of the multi-stepped game board.

4 Claims, 2 Drawing Sheets

FRACTIONAL-ARITHMETIC-TEACHING GAME AND METHOD FOR PLAYING

BACKGROUND OF THE INVENTION

1. Field of the Invention

The present invention relates to an apparatus and a method for playing a math-teaching board game which enables player students while manipulating game-pieces to gain an understanding of the concept of fractions and arithmetical operations associated therewith.

2. Description of the Prior Art

Various board games have been utilized in the prior art for educational and amusement purposes. Mathematical number type games have been utilized in the prior art. Multi-leveled board games in a variety of forms are known in the art and have been used for a multitude of reasons.

U.S. Pat. No. 3,579,860 to Strem discloses a visual aid for teaching and testing the sight reading of the fractional divisions of an inch.

U.S. Pat. No. 4,946,168 to Fauls discloses a 3-dimensional board game wherein the object of the game is to move around a representation of Mount Olympus until reaching the top of the mountain.

U.S. Pat. No. 5,102,339 to Parriera discloses a mathematical education board game including circuitous paths with mathematical operation symbols, questions and a die which determines advancement of game tokens.

A number of other inventions pertaining to math-teaching games have been proposed. U.S. Patents illustrating these types of inventions include: Nos. 2,930,146 to Cassel; 3,204,344 to McMeen; 4,778,390 to Marans; and 5,033,754 to Finch.

However, none of the above inventions and patents, taken either singly or in combination, is seen to describe the instant invention as claimed. The prior art games and the like do not provide the elements of entertainment and chance combined with the educational understanding of the difficult subject of teaching fractions as practiced by the instant invention.

SUMMARY OF THE INVENTION

The present invention relates to an apparatus and a method for playing a math-teaching board game which enables a player student while manipulating game-pieces to gain an understanding of the concept of fractions and arithmetical operations associated therewith. The game is played by 2 to 4 players. The game includes a pyramidical-shaped board having a continuous path of steps, individual tokens, a die, a plurality of decks of question cards related to arithmetic operators, fraction boards and a slide box for placement of the fraction boards thereon. In playing the game, the player skillfully moves a selective game token up a number of steps based on the roll of the die. Each step on the board displays the arithmetic operator which determines which deck of question cards is selected. The player uses the fraction boards and the slide box in an attempt to visually determine an answer to a selected question. If the player answers the question correctly, the player's token remains on the step advanced by the die roll. If the player does not provide the correct answer, the game token must be returned to its origin. Winning the game is accomplished by the leading player in skillfully moving the selective game token to the top step of the multi-stepped game board.

Accordingly, it is a principal object of the invention to provide for an apparatus and a method for playing a math-teaching game which enables a player while manipulating game-pieces to gain an understanding of the concept of fractions and arithmetical operations associated therewith.

It is another object of the invention to provide an apparatus and a method for playing a mathematical educational game which involves a game of chance and the ability to solve fraction problems to effect a learning procedure relative to the players.

It is a further object of the invention is provide an apparatus that includes a multi-stepped pyramidical game board, individual tokens, a die, decks of question cards, fraction boards and a slide box for placement of the fraction boards.

Still another object of the invention to provide a method of teaching difficult math fractions in a manner that playing-students will enjoy.

Yet, still another object of the invention is to provide a math-teaching game using a visual aid kit of materials for assisting playing-students in learning fractions.

It is an object of the invention to provide improved elements and arrangements thereof in an apparatus and a method for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

APPARATUS ACCORDING TO THE INVENTION

Figure 1:
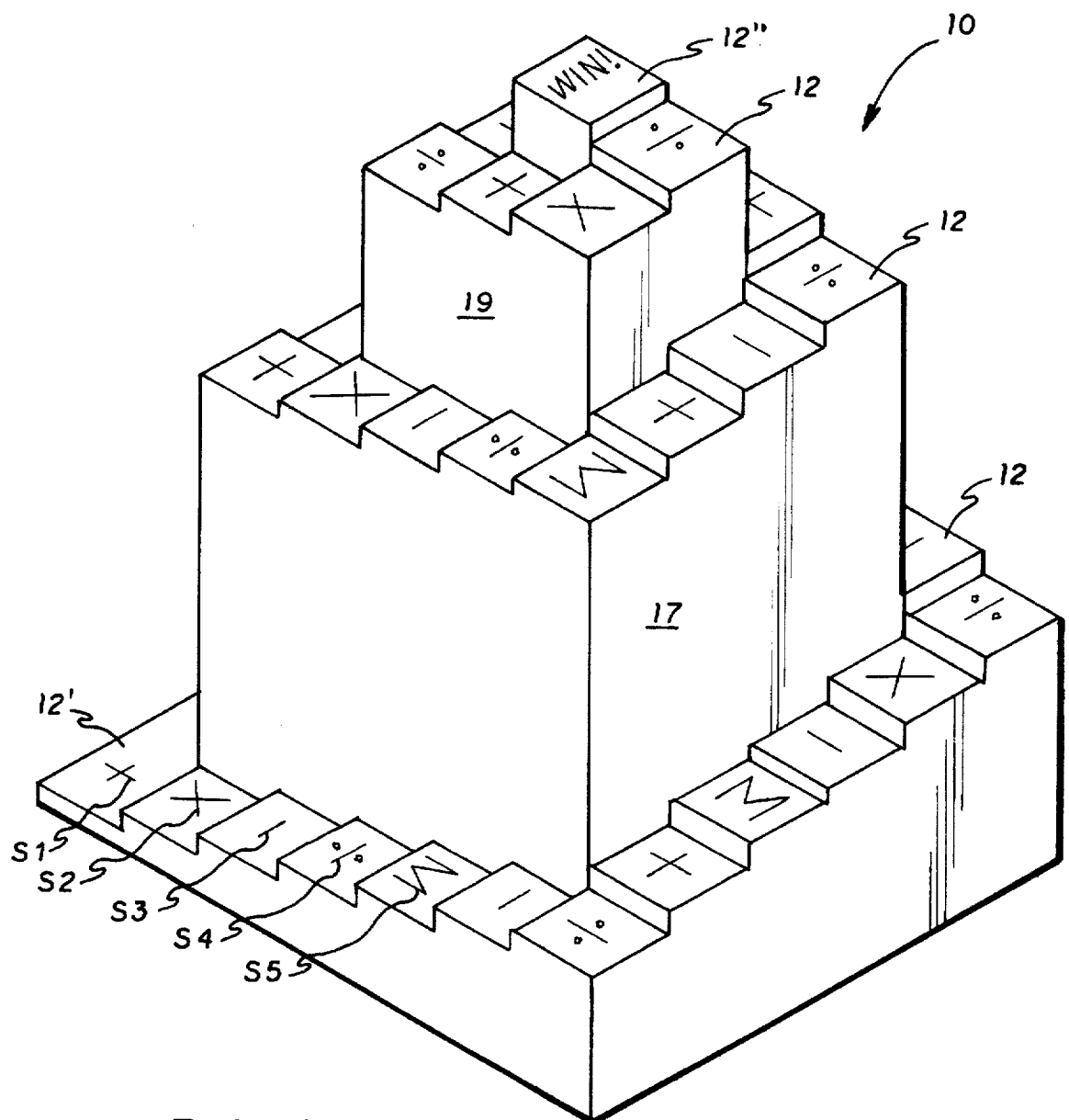
FIG. 1 is a perspective view of a multi-stepped pyramidical-shaped game board used in a math-teaching game in accordance with the invention.

Referring to FIG. 1, a preferred form of the game board is shown, being generally indicated at 10. Apparatus which includes the game board 10 and numerous game pieces is used for playing a math-teaching game which enables player students while manipulating game-pieces during the playing of the game to gain an understanding of the concept of fractions and arithmetical operations associated therewith. The game is played by 2 to 4 players. The game board 10 has a generally pyramidical structure having a square base 13 and four side walls 15 progressively extending upward from the perimeter of base 13. Within side walls 15 are towered structures 17 and 19. The playing surface for the board 10 is comprised of a single continuous path of a series of steps or spaces 12 over which playing pieces or tokens 14 (See FIG. 2) travel in playing the game. The path leads from the lowest step 12', upwardly around the walled square structures 17 and 19 of the board 10 and terminating at the highest step 12" marked WIN! at the pinnacle of the board 10. The movement of playing pieces up the progressively-ascending steps 12 to the pinnacle visually shows the players that they are making progress towards winning the game and at the same time enhancing their understanding of mathematical fractions. Each step 12 has visually displayed thereon a symbol of one of five arithmetic operator categories. The five different symbols $S^1$, $S^2$, $S^3$, $S^4$, and $S^5$ have been randomly and individually placed throughout the step arrangement. The five arithmetic operator categories utilized in playing the game are addition (+), substraction (−), multiplication (X), division (÷) and a multiple (M) of three of the first four categories.

Figure 2:
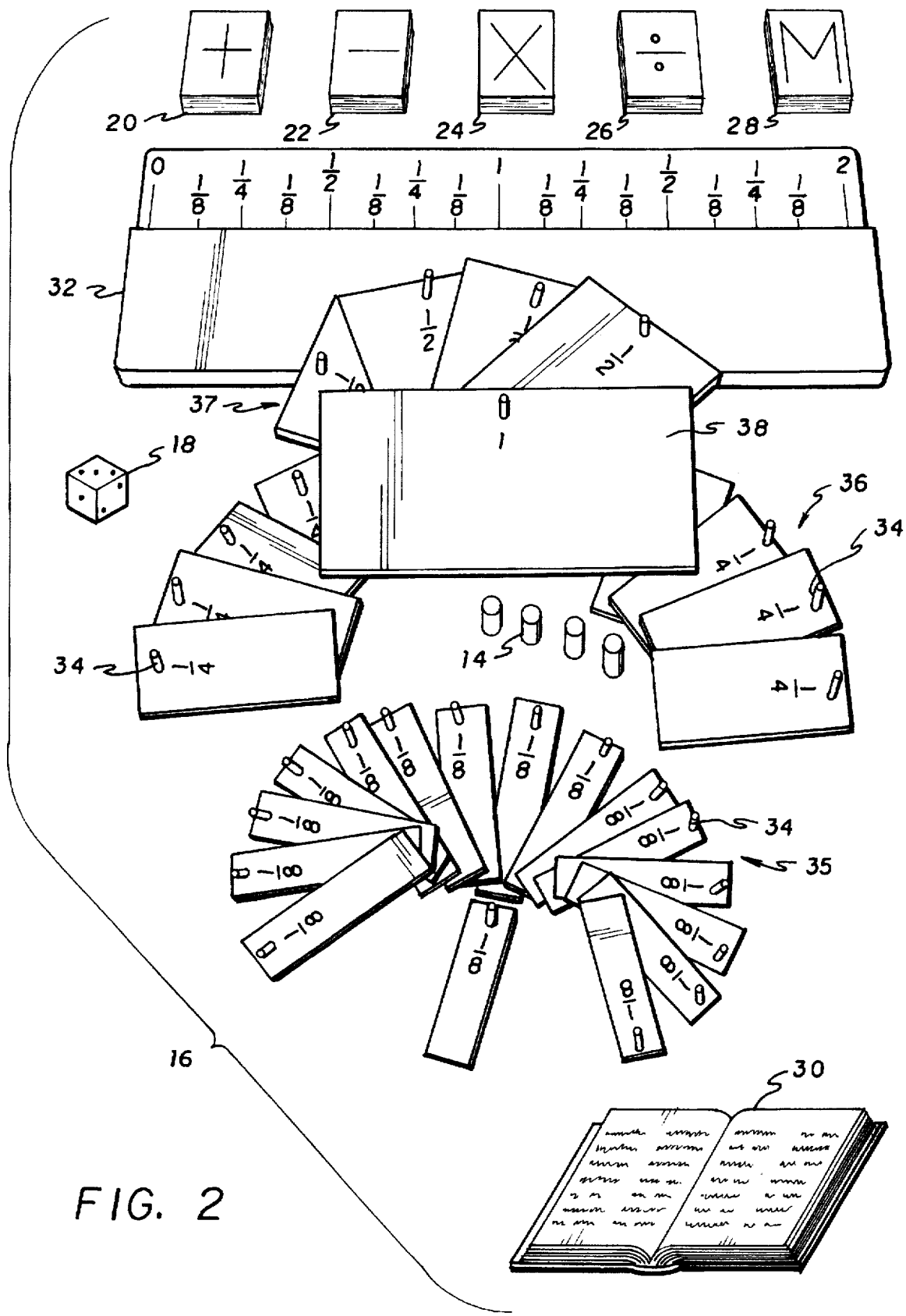
FIG. 2 is a perspective view of a visual aid kit of materials used in playing the math-teaching game in accordance with the invention.

FIG. 2 shows a visual aid kit 16 of materials used in playing the game which assist the player students in visually learning fractions. The kit 16 represents, in essence, a comprehensive arithmetic teaching program which is tangible and is an easily understood teaching aid. The four tokens 14 identify individual players for directing movements along the continuous path. A die 18 is used for randomly generating a number for movement of the respective token along the continuous path to the generated step number and the numbered step visually reveals one of the five arithmetic operator categories. A pair of dice could be used, if desired. Cards are arranged in five piles or decks for the five arithmetic operator categories; namely, (+) addition cards 20, (−) substraction cards 22, (X) multiplication cards 24, (÷) division cards 26 and (M) multiple cards 28, wherein the multiple (M) covers any three of the first four categories. Thus, there is a deck of cards for each of the five categories and each card in the five decks sets forth a different fractional arithmetic question.

A manual 30 containing charts of the questions and answers is used in conjunction with the playing pieces 14 in playing the game. The manual 30 visually shows the player the correct answer to a question. The questions in the manual 30 are the same as the questions listed on the five decks 20, 22, 24, 26, 28 of cards for each of the five categories. The following chart shows all the questions and answers for the category "Addition (+) and for the purposes of brevity, only the first and last questions for each of the other four categories.

ADDITION (+)

| (FIRST COLUMN) | (SECOND COLUMN) | (THIRD COLUMN) |
|---|---|---|
| 1 + 1 = 2 | 1 + ⅝ = 1 ⅝ | ¾ + ½ = 1 ¼ |
| 1 + ½ = 1 ½ | 1 + ⅜ = 1 ⅜ | ¾ + ⅝ = 1 ⅜ |
| 1 + ¼ = 1 ¼ | 1 + ⅝ = 1 ½ | ¾ + ¾ = 1 ½ |
| 1 + ⅛ = 1 ⅛ | 1 + ⅝ = 1 ⅝ | ¾ + ⅛ = ⅞ |
| 1 + ⅜ = 1 ½ | 1 + ⅝ = 1 ⅝ | ¾ + ¼ = 1 |
| 1 + ¾ = 1 ¾ | 1 + ⅞ = 1 ⅞ | ¾ + ⅜ = 1 ⅛ |

| (FOURTH COLUMN) | (FIFTH COLUMN) | (SIXTH COLUMN) |
|---|---|---|
| ¾ + ⅝ = 1 ¼ | ½ + ⅝ = ⅞ | ¼ + ⅛ = ⅜ |
| ¾ + ⅝ = 1 ⅜ | ½ + ⅜ = ⅞ | ¼ + ⅝ = ¾ |
| ¾ + ⅝ = 1 ½ | ½ + ⅝ = 1 | ¼ + ¾ = 1 |
| ¾ + ⅞ = 1 ⅝ | ½ + ⅝ = 1 ⅛ | ⅛ + ⅛ = ¼ |
| ½ + ½ = 1 | ½ + ⅝ = 1 ¼ | ⅛ + ⅝ = ⅜ |
| ½ + ¼ = ¾ | ¼ + ⅞ = 1 ⅛ | ⅛ + ⅜ = ½ |
| ½ + ¾ = 1 | ¼ + 1 = 1 ¼ | ⅛ + ⅝ = ⅝ |
| ½ + ¾ = 1 ¼ | ¼ + ½ = ¾ | ⅛ + ⅝ = ¾ |
| ½ + ⅛ = ⅝ | ¼ + ¼ = ½ | |

| SUBTRACTION (−) | MULTIPLICATION (x) |
|---|---|
| 2 − 1 = 1 | 1 × 1/8 = 1/8 |
| 1 1/2 − 7/8 = 5/8 | 2 × 2/2 = 2 |
| DIVISION (÷) | MULTIPLE (M) |
| 1 ÷ 1/8 = 8 | 1 × 1/8 + 1/8 = 1/4 |
| 1/4 ÷ 1/8 = 2 | 1 × 12/8 + 1/2 = 2 |

The instant invention includes a system which constitutes an intermediate procedural step whereby a player may physically manipulate certain game pieces to visually determine a preliminary answer to a question before actually reciting the answer. The player manipulates four groups 35, 36, 37 and 38 of slide fractional-ruler boards. Each board is rectangular shaped and has an easy retrievable peg handle 34 at one end. As shown in FIG. 2, the first board group 35 consists of 16 boards marked with the fraction "⅛"; the second 36, 8 boards marked with "¼"; the third 37, 4 boards marked with "½"; and the fourth board group 38 consists one board marked with "1". The player determines a preliminary answer by attempting to properly select which represent the correct answer in a visual and physical form. The properly selected boards would be the ones that represent the question and the correct answer. After selecting the boards, the player positions the boards on a conventional ruler piece or ruler box 32, preferably one having a length of two inches. The ruler is preferably made in a white color and the slide fractional-ruler pieces of different colors. The "½" piece is preferably made in a purple color; the "¼" piece, in red; and the "⅛" piece, in green. Thus, a player may determine a preliminary answer and possibly a correct answer by positioning the appropriate colored pieces on the white background of the ruler 32. The color coding of game pieces will enable a player to distinguish one piece from another and will enhance the learning aspect in the playing of the game. If two pieces labelled "½" in purple color are positioned side by side on the left side of the ruler 22 with its white background, the player can visually see that such pieces equal "1" in pleasing colors. Thus, the playing of these colorful games pieces will involve the play and the fun of attempting to select the preliminary answer. Further, it is readily seen that two or three pieces corresponding to the indicia of a question can readily assist a player in rendering a correct answer, the player selecting the correct slide fractional-ruler pieces and positioning them in the proper position on the ruler and visually seeing the answer on the ruler 32.

Attention is directed to above cited U.S. Pat. No. 3,579, 860 which discloses the use of visual aid teaching and testing the sight reading of the fractional divisions of an inch. This patented disclosure is incorporated herein by reference.

RULES FOR PLAYING THE GAME

The game of the instant invention is entitled "MEASURE-UP" and is played generally in the following manner: Each of the players chooses one of the four playing tokens. The game is started by a toss of the die to determine which of the players starts the game and determines the order of play. The highest roller moves first as the game begins. A further cast of the die by the players in turn determines their respective advancing positions starting from the lowest step on the board. Any position occupied by the advance of a playing token is maintained only if a players answers the question on the card that the player draws. The question on the card relates to fractions in the arithmetic operator categories of addition, subtraction, division, multiplication or a multiple of the other four categories. A player may determine a preliminary answer and possibly a correct answer by positioning the appropriate slide fractional-ruler pieces on the ruler. The manipulation of these slide pieces rest on the same principle as the workings of a standard ruler. An answer to a question is confirmed by the viewing of the correct answer in the math manual of questions and answers relating to fractions. Failure to answer a question brings a player back to the point of origin. The continuous path starts at the lowest step, leads upwardly on the steps around the sides of the board and terminates at the highest step marked "WIN!". The first player's token to advance successfully to this final step wins the game. It is readily apparent that the playing of this mathematical educational game which involves a game of chance and the ability to solve fraction problems enhances the learning procedure of the players. The answer to many of the questions will become obvious to the players, especially after playing the game numerous times.

METHOD ACCORDING TO THE INVENTION

The method of the instant invention for playing a math-teaching game which enables player students while manipulating game-pieces to gain an understanding of the concept of fractions and arithmetical operations associated therewith involves the following steps:

playing a math-teaching game on a three-dimensional playing board such as a pyramidical-shaped board, having a single continuous path of progressively-ascending steps leading from a starting step to a final step at the pinnacle of the playing board;

distributing identifiable tokens to players which tokens are utilized for directing their respective movements along the steps of the continuous path;

rolling a die member for determining which player starts the game;

rolling the die member in turn by the players for randomly generating a number for movement of the respective token along the steps of the continuous path to the generated step number and the numbered step visually revealing a selective arithmetic operator category from five categories;

the five arithmetic operator categories being addition (+), substraction (−), multiplication (X), division (÷) and a multiple of three of the first four categories;

selecting an appropriate deck from a plurality of decks which selected deck is identifiable as the same as the revealed selective arithmetic operator category;

selecting a question card from the selected deck for revealing a fractional-arithmetic question thereon;

selecting a plurality of slide fractional-ruler pieces having fractional-ruler indicia thereon for operative placement of the selected pieces onto the slide ruler board, the selected pieces of fractional-ruler indicia corresponding to the fractional indicia of the question on the card, whereby a playing player attempts to visually produce a preliminary answer;

comparing any determined answer to the fractional-arithmetic question with a correct answer disclosed in an answer manual for the purpose of determining the direction of movement of the token of the playing player;

a correct answer permitting the movement of the token to the generated step to remain thereon, and an incorrect answer compelling the movement of the token to the step of origin; and terminating the play of the game by the act of the leading player's token reaching the final step at the pinnacle on the continuous path of the game board.

It is to be understood that the present invention is not limited to the apparatus and the method described above, but encompasses any and all forms of the invention within the scope of the following claims.

I claim:

1. A math-teaching game which enables player students while manipulating their game-pieces to gain an understanding of the concept of fractions and arithmetical operations associated therewith, comprising:

a pyramidical game board having a single continuous path of steps progressively extending upward from a starting step to a final pinnacle step, each of said steps having a symbol designating an arithmetic operator selected from the group consisting of addition, substraction, multiplication, division and combinations thereof;

tokens identifying individual players for directing movements along the continuous path;

a die member for randomly generating a number for movement of the tokens up the steps of the continuous path to a generated step number;

a plurality of card decks containing question cards, each of said decks corresponding to one said arithmetic operator, each of said question cards containing a fractional-indicia question thereon;

a ruler box;

a plurality of slide fractional-ruler pieces having fractional-ruler indicia thereon for operative placement of selected pieces onto the ruler box, the selected pieces of fractional-ruler indicia correspond to the fractional indicia of the question on the card, whereby a playing player attempts to visually produce a preliminary answer;

whereby a player compares the preliminary answer with a correct answer on an answer sheet for determining the direction of movement of the token of the playing player; and whereby the play of the game is terminated when a player correctly answers a series of questions and that player's token reaches the final pinnacle step of the continuous path on the game board.

2. The math-teaching game according to claim 1, wherein the starting step is located at an outer lower corner of the game board.

3. A method for playing a math-teaching game which enables player students while manipulating game-pieces to gain an understanding of the concept of fractions and arithmetical operations associated therewith, comprising:

providing a pyramidical-shaped playing board having a single continuous path of progressively-ascending steps leading from a starting step to a final pinnacle step, each of said steps having a symbol designating an arithmetic operator selected from the group consisting of addition, substraction, multiplication, division and combinations thereof;

distributing identifiable tokens to players;

rolling a die member in turn by the players for randomly generating a number and moving one of the respective tokens along the continuous path to a step corresponding to the number generated;

selecting one of a plurality of decks corresponding to the arithmetic operator designated by the step moved to;

selecting a question card from the selected deck, said card having a fractional-arithmetic question thereon;

selecting a plurality of slide fractional-ruler pieces having fractional-ruler indicia thereon for operative placement of the selected pieces onto a ruler box, the selected pieces of fractional-ruler indicia relating to the fractional-arithmetic question on the card, whereby a player attempts to visually produce a preliminary answer;

providing the preliminary answer to the fractional-arithmetic question and comparing the answer with a correct answer disclosed on an answer form sheet;

a correct answer permitting the movement of the token to the generated step to remain thereon, and an incorrect answer compelling the movement of the token to the step of origin; and terminating the play of the game by the act of a leading player's token reaching the final pinnacle step.

4. A method according to claim 3, further comprising:

rolling the die member for determining which player starts the game.

* * * * *